(12) United States Patent
Deliz Centeno et al.

(10) Patent No.: US 11,320,958 B2
(45) Date of Patent: May 3, 2022

(54) MOVING ABOUT A SETTING

(71) Applicant: Apple Inc., Cupertino, CA (US)

(72) Inventors: Luis R. Deliz Centeno, Fremont, CA (US); Avi Bar-Zeev, Oakland, CA (US)

(73) Assignee: APPLE INC., Cupertino, CA (US)

( * ) Notice: Subject to any disclaimer, the term of this patent is extended or adjusted under 35 U.S.C. 154(b) by 27 days.

(21) Appl. No.: 17/051,703

(22) PCT Filed: May 1, 2019

(86) PCT No.: PCT/US2019/030120
§ 371 (c)(1),
(2) Date: Oct. 29, 2020

(87) PCT Pub. No.: WO2019/213200
PCT Pub. Date: Nov. 7, 2019

(65) Prior Publication Data
US 2021/0232288 A1 Jul. 29, 2021

Related U.S. Application Data

(60) Provisional application No. 62/831,012, filed on Apr. 8, 2019, provisional application No. 62/666,015, filed on May 2, 2018.

(51) Int. Cl.
*G06F 3/04815* (2022.01)
*G02B 27/00* (2006.01)
(Continued)

(52) U.S. Cl.
CPC ..... *G06F 3/04815* (2013.01); *G02B 27/0093* (2013.01); *G06F 3/013* (2013.01);
(Continued)

(58) Field of Classification Search
None
See application file for complete search history.

(56) References Cited

U.S. PATENT DOCUMENTS 7,889,212 B2   2/2011  Schulz et al.
9,323,444 B2 *  4/2016  Nishio ................ G06F 3/04883
(Continued)

FOREIGN PATENT DOCUMENTS

JP     2013-250830 A    12/2013
JP     2017-84422 A      5/2017

OTHER PUBLICATIONS

Applicant-Initiated Interview Summary received for U.S. Appl. No. 16/796,747, dated Nov. 22, 2021, 4 pages.
(Continued)

*Primary Examiner* — Toan H Vu
(74) *Attorney, Agent, or Firm* — Dentons USLLP

(57) ABSTRACT

Techniques for moving about a computer simulated reality (CSR) setting are disclosed. An example technique includes displaying a current view of the CSR setting, the current view depicting a current location of the CSR setting from a first perspective corresponding to a first determined direction. The technique further includes displaying a user interface element, the user interface element depicting a destination location not visible from the current location, and, in response to receiving input representing selection of the user interface element, modifying the display of the current view to display a destination view depicting the destination location, wherein modifying the display of the current view to display the destination view includes enlarging the user interface element.

25 Claims, 12 Drawing Sheets

(51) Int. Cl.
  *G06F 3/01* (2006.01)
  *G06T 19/00* (2011.01)
  *G02B 27/01* (2006.01)
(52) U.S. Cl.
  CPC ...... *G06T 19/003* (2013.01); *G02B 2027/014* (2013.01); *G06F 2203/04806* (2013.01)

(56) References Cited

U.S. PATENT DOCUMENTS

| | | | | |
|---|---|---|---|---|
| 2007/0233370 | A1* | 10/2007 | Asada | G01C 21/3602 701/431 |
| 2009/0259394 | A1* | 10/2009 | Vu | G01C 21/3446 701/533 |
| 2011/0010672 | A1* | 1/2011 | Hope | G06F 3/0486 715/841 |
| 2011/0102458 | A1* | 5/2011 | Takiguchi | G06F 3/0486 345/629 |
| 2015/0228054 | A1* | 8/2015 | Takimoto | G06F 3/0485 345/672 |
| 2016/0210271 | A1* | 7/2016 | Kinoshita | G06F 40/134 |
| 2016/0350972 | A1 | 12/2016 | Kauffmann et al. | |
| 2016/0353012 | A1 | 12/2016 | Kao et al. | |
| 2017/0160815 | A1 | 6/2017 | Glazier et al. | |
| 2017/0308990 | A1 | 10/2017 | Middleton et al. | |
| 2018/0246565 | A1 | 8/2018 | Moon et al. | |
| 2020/0273146 | A1 | 8/2020 | Burgoyne et al. | |

OTHER PUBLICATIONS

Office Action received for Japanese Patent Application No. 2020-560953, dated Oct. 27, 2021, 6 pages (3 pages of English Translation and 3 pages of Official Copy).

Non-Final Office Action received for U.S. Appl. No. 16/796,747, dated Aug. 19, 2021, 19 pages.

International Preliminary Report on Patentability received for PCT Patent Application No. PCT/US2019/030120, dated Nov. 12, 2020, 10 pages.

International Search Report and Written Opinion received for PCT Patent Application No. PCT/US2019/030120, dated Jul. 25, 2019, 11 pages.

* cited by examiner

MOVING ABOUT A SETTING

CROSS REFERENCE TO RELATED APPLICATIONS

This Application is a U.S. National Stage Patent Application of PCT/US2019/030120, entitled "MOVING ABOUT A COMPUTER SIMULATED REALITY SETTING," filed May 1, 2019, which claims priority to U.S. Patent Application No. 62/666,015, entitled "TELEPORTATION," filed on May 2, 2018 and to U.S. Patent Application No. 62/831,012, entitled "MOVING ABOUT A COMPUTER SIMULATED REALITY SETTING," filed on Apr. 8, 2019. The contents of each of these applications are hereby incorporated by reference in their entireties.

FIELD

The present disclosure relates to the display of digital content on devices in computer simulated reality.

BACKGROUND

Conventional electronic devices include a screen that displays a view of a computer simulated reality (CSR) setting and include input mechanisms to receive user input. Responsive to receiving user input, the displayed view of the CSR setting changes. As perceived by a user of the electronic device, such changing can represent movement about the CSR setting.

BRIEF SUMMARY

The present disclosure describes techniques for moving about a CSR setting. As CSR applications become more ubiquitous, there is need for techniques for quickly and efficiently moving about CSR settings. For example, a user immersed in a virtual reality setting (e.g., a house) may wish to move to a different portion of the setting or to a different virtual setting altogether (e.g., an underwater setting). To enhance movement experience, the present disclosure presents techniques allowing for efficient, natural, seamless, and/or comfort-preserving movement between locations in CSR settings. In this way, an improved CSR experience is provided to users.

According to some embodiments, a current view of the CSR setting is displayed. The current view depicts a current location of the CSR setting from a first perspective corresponding to a first determined direction. A user interface element is displayed. The user interface element depicts a destination location not visible from the current location. In response to receiving input representing selection of the user interface element, the display of the current view is modified to display a destination view depicting the destination location. In some embodiments, modifying the display of the current view to display the destination view includes enlarging the user interface element.

According to some embodiments, a current view of a CSR setting is displayed. The current view depicts a current location of the CSR setting from a first perspective corresponding to a first determined direction. A user interface element is displayed. The user interface element depicts a destination location of the CSR setting. The destination location, when displayed in the user interface element, is displayed at a larger scale relative to the display of the current location in the current view. In response to receiving input representing selection of the user interface element, the display of the current view is modified to display a destination view of the CSR setting, the destination view depicting the destination location displayed in the user interface element. In some embodiments, the destination location, when displayed in the destination view, is displayed at the same scale as the display of the destination location in the user interface element.

DESCRIPTION

Figure 1A:
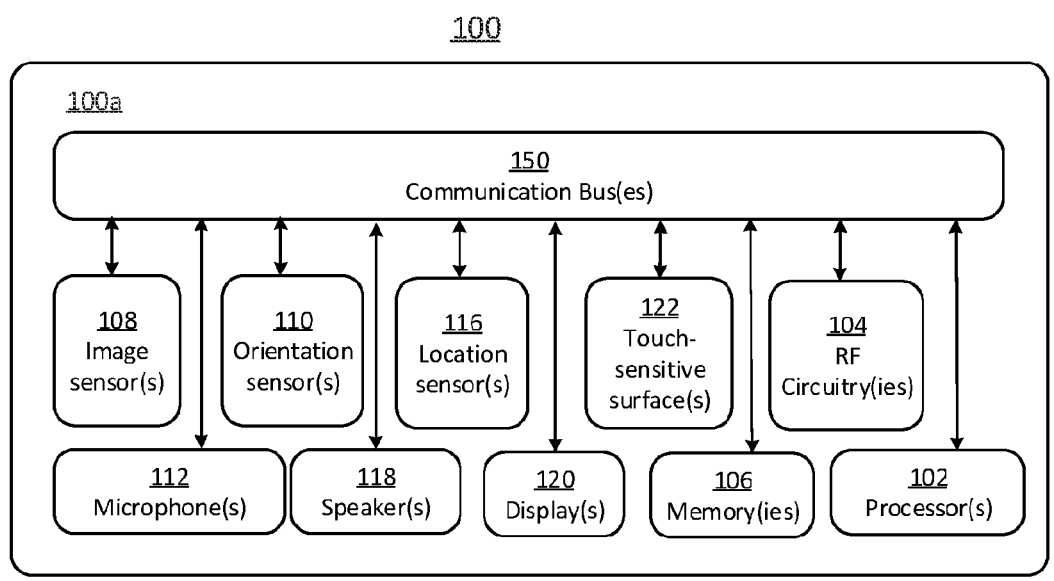
FIGS. 1A-1B depict exemplary systems for use in various computer simulated reality technologies, including virtual reality and mixed reality.

Various examples of electronic systems and techniques for using such systems in relation to various simulated reality technologies are described.

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, an SR system may detect an individual walking a few paces forward and, responsive thereto, adjust graphics and audio presented to the individual in a manner similar to how such scenery and sounds would change in a physical setting. Modifications to attribute(s) of virtual object(s) in an SR setting also may be made responsive to representations of movement (e.g., audio instructions).

An individual may interact with and/or sense an SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). An MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationary with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Figure 1B:
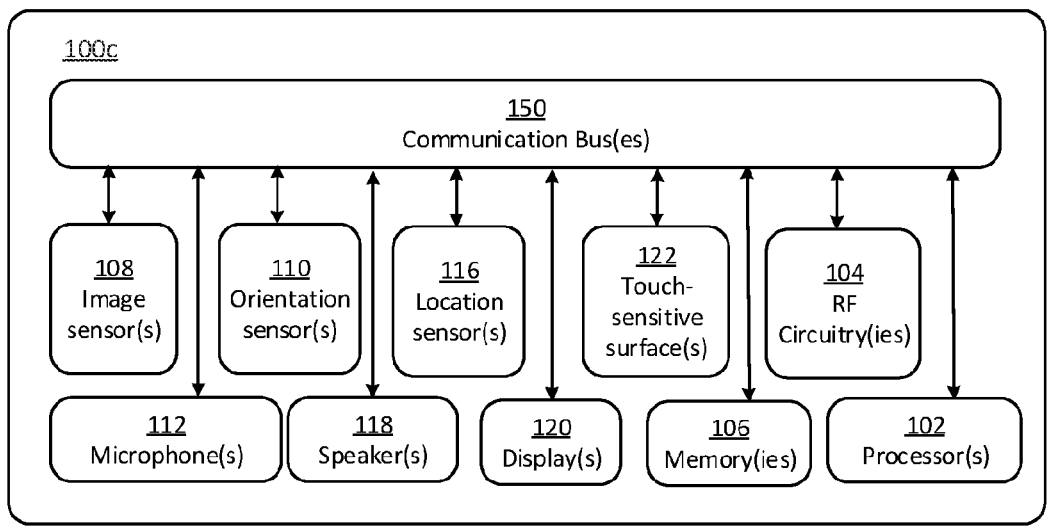
Figure 1B:
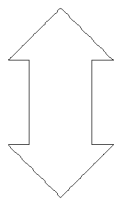
Figure 1B:
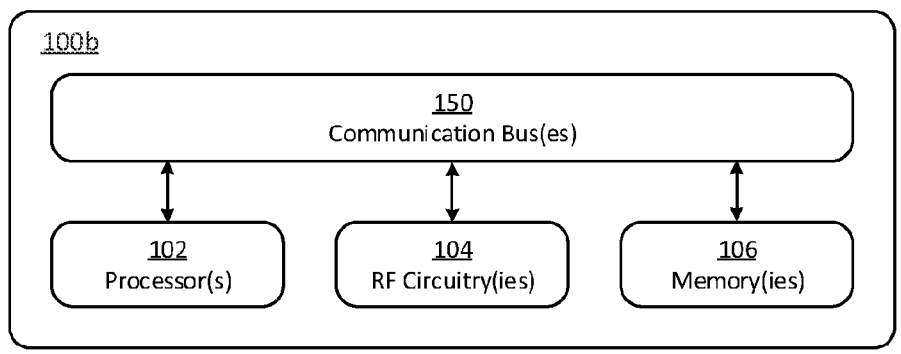

FIG. 1A and FIG. 1B depict exemplary system 100 for use in various simulated reality technologies.

In some examples, as illustrated in FIG. 1A, system 100 includes device 100*a*. Device 100*a* includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*a*.

In some examples, elements of system 100 are implemented in a base station device (e.g., a computing device, such as a remote server, mobile device, or laptop) and other elements of system 100 are implemented in a second device (e.g., a head-mounted device). In some examples, device 100*a* is implemented in a base station device or a second device.

As illustrated in FIG. 1B, in some examples, system 100 includes two (or more) devices in communication, such as through a wired connection or a wireless connection. First device 100*b* (e.g., a base station device) includes processor(s) 102, RF circuitry(ies) 104, and memory(ies) 106. These components optionally communicate over communication bus(es) 150 of device 100*b*. Second device 100*c* (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*c*.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some examples, system 100 is a projection-based system that uses retinal projection to project images onto an individual's retina or projects virtual objects into a physical setting (e.g., onto a physical surface or as a holograph).

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical setting around system 100. In some examples, image sensor(s) 108 include a first image sensor and a second image sensor. The first image sensor and the second image sensor are optionally configured to capture images of physical elements in the physical setting from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some examples, system 100 includes microphones(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

With reference now to FIGS. 2A-H and 3A-B, exemplary techniques for moving about a computer simulated reality (CSR) setting are described.

Figure 2A:
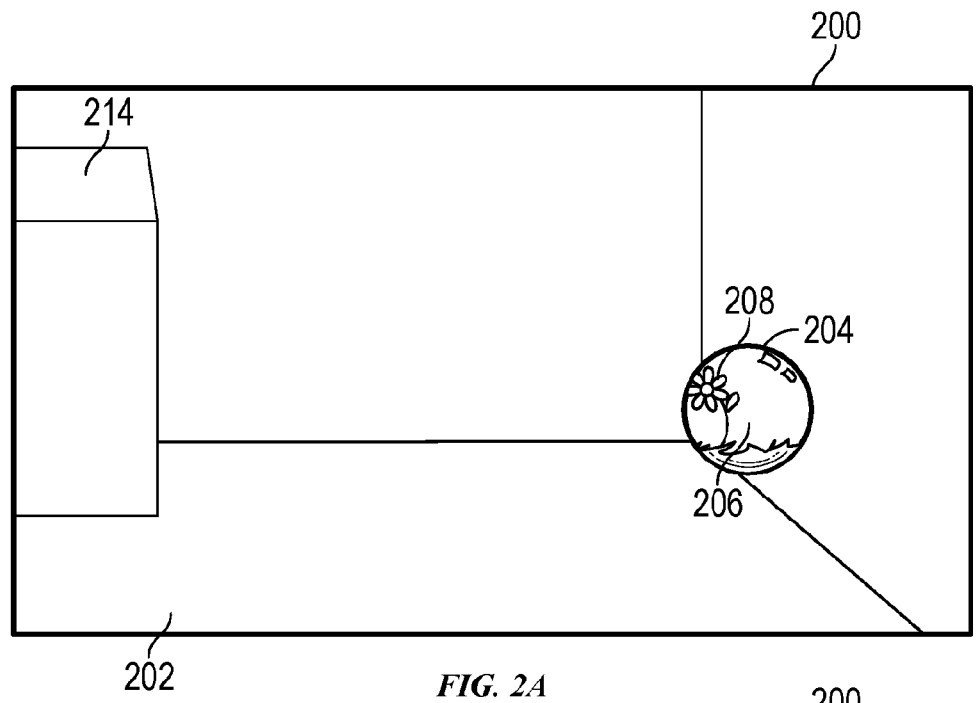
FIGS. 2A-2H illustrate exemplary views demonstrating the manner in which a view of a CSR setting changes responsive to receiving input representing selection of a user interface element.

FIG. 2A illustrates a current view 202 (e.g., a field of view) of a CSR setting (e.g., a house) displayed on a device 200 associated with a user. In some embodiments, device 200 is the same as or similar to device 100*a*, 100*b*, or 100*c* described above. The user is considered to be present in the CSR setting, and is therefore provided view 202 of the CSR setting. View 202 includes user interface element 204. User interface element 204 depicts destination view 206 (e.g., an embedded view).

In some embodiments, a user is associated with an avatar. The avatar is a virtual object that can represent a user's presence in a CSR setting. Thus, in some embodiments, a user's view of a CSR setting can be the view of an avatar associated with the user. For example, view 202 can be the view of an avatar associated with the user.

In some embodiments, one or more views of a CSR setting depict a respective location of the CSR setting. For example, as shown in FIG. 2A, view 202 depicts a current location in the CSR setting (e.g., a location in the living room of the house having chair 214) at which the user is located, and destination view 206 of the CSR setting depicts a destination location in the CSR setting (e.g., a location in the backyard of the house). Although the current location (e.g., the living room location) and the destination location (e.g., the backyard location) are described as two locations within the same CSR setting, in some embodiments, the current location and the destination location are respective locations in different CSR settings. In other words, in some embodiments, the living room of the house is associated with a different CSR setting than the backyard of the house.

In some embodiments, user interface element 204 depicts a destination location of a CSR setting not visible from the current location of the CSR setting (e.g., not visible absent user interface element 204). For example, the destination location of the backyard of the house depicted by view 206 would not be visible from the current location depicted by view 202 if user interface element 204 were absent.

In some embodiments, each view of a CSR setting depicts a location of the CSR setting from a respective perspective. For example, view 202 depicts a current location from a first perspective and view 206 depicts a destination location from a second perspective.

In some embodiments, each perspective corresponds to a respective determined direction. A determined direction represents a direction associated with a field of view of a user. In some embodiments, the direction associated with a field of view of a user is determined based on a user's pose (e.g., position and orientation of user's head determined using device 200). In some embodiments, positions and orientations determined by the device 200 are determined relative to an object in a physical setting, for instance, as determined by one or more sensors (e.g., camera) of the device 200. In some embodiments, positions and orientations are determined based on movement of the device 200, for instance, as determined by one or more sensors (e.g., accelerometer, camera) of the device 200. In some embodiments, the direction associated with a field of view of a user is additionally or alternatively determined based on a user's gaze direction (e.g., determined using device 200).

In some embodiments, a gaze direction is determined using eye gaze data obtained using a head facing sensor. In particular, in some embodiments, device 200 includes a head-mounted display and includes a head facing sensor directed towards a user of device 200, and device 200 obtains eye gaze data using the head facing sensor. Device 200 uses the eye gaze data to determine the gaze direction and/or gaze depth (e.g., gaze depth associated with a determined gaze direction) of the user. In some embodiments, determining the gaze direction and/or gaze depth of the user using eye gaze data includes determining, from the eye gaze data, the user's pupil and/or cornea position and/or the rotation of the user's eye. One of ordinary skill in the art will appreciate that any suitable technique for determining the gaze direction and/or gaze depth of the user using eye gaze data may be employed.

In some embodiments, each view depicts a respective location of a CSR setting from a respective perspective corresponding to a determined direction. For example, view 202 depicts a current location from a first perspective corresponding to a first determined direction. View 206 depicts a destination location from a second perspective corresponding to a second determined direction (e.g., the same as or different from the first determined direction). View 206 thus represents a portion of a user's perspective if the user were located at the destination location.

In some embodiments, device 200 is configured to use a determined direction and a CSR location to determine and display views depicting respective CSR locations. For example, using the first direction and the current location of the CSR setting, device 200 determines current view 202 depicting the living room location from the first perspective corresponding to first direction. In some embodiments, using a determined direction and a destination location (e.g., the backyard location), device 200 determines view 206 depicting the backyard location.

In some embodiments, user interface element 204 may be employed as a portal to a destination location in the CSR setting (or another CSR setting). Thus, a user interface element can be used to transport a user to a destination location depicted by a view. By way of example, a user can interact with user interface element 204 to teleport the user from the living room location depicted by view 202 to the backyard location depicted by view 206. In some embodiments, teleporting a user between locations in a CSR setting includes teleporting the avatar associated with the user between the locations.

In some embodiments, a view depicted by a user interface element includes a live preview of a destination location, allowing a user to view the destination location in real time. The view may, for instance, show movement one or more virtual objects (e.g., flower 208 in view 206 is blowing in the wind) located at the destination location.

As shown in FIG. 2A, in some embodiments, user interface element 204 is spherical (e.g., a bubble). However, it is to be understood that in other embodiments, user interface element 204 can be any two or three dimensional shape (e.g., a cube, disc, polygon, polyhedron, etc.). In some embodiments, the border of user interface element 204 and/or the view displayed in the user interface element has a luster and/or is holographic so that user interface element 204 appears three-dimensional and/or is more readily noticeable.

FIGS. 2B-H show various manners in which a view (e.g., the display of a view) can be modified. A view can be modified, for instance, by shrinking the view, enlarging the view, moving the view, and/or replacing the view with another view. In some embodiments, replacement of a view constitutes teleportation of the user between two locations in a CSR setting, for instance, as perceived by the user of the device.

In some examples, modifying a view includes modifying a user interface element associated with the view. By way of example, enlarging, shrinking, or moving (e.g., displacing) a user interface element may in turn enlarge, shrink, or move the view depicted by the user interface element, respectively, in a corresponding manner.

In some embodiments, a view is modified in response to input representing selection of a user interface element, for instance, received from a user. By providing such input, a user can interact with the user interface element to explore a CSR setting. In some embodiments, the input is a hand gesture input, peripheral device input (e.g., keyboard input, mouse input), voice input, gaze input, motion input (e.g., as detected by one or more accelerometers), or any combination thereof. In some embodiments, a display of device 200 is touch-sensitive, and the input is a touch input. In some embodiments, the input represents movement of an object (e.g., a user hand, an external electronic device) towards and/or away from device 200 and device 200 determines that the input represents such movement. In some embodiments, device 200 determines a magnitude (e.g., a distance, a velocity, an acceleration) of such movement.

Figure 2B:
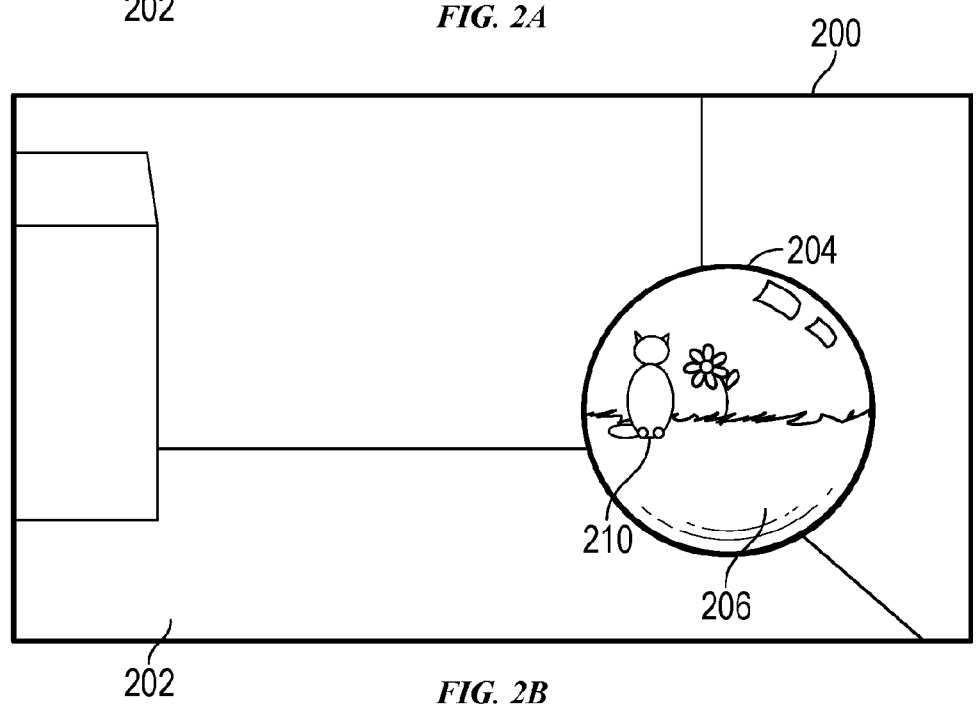
Figure 2C:
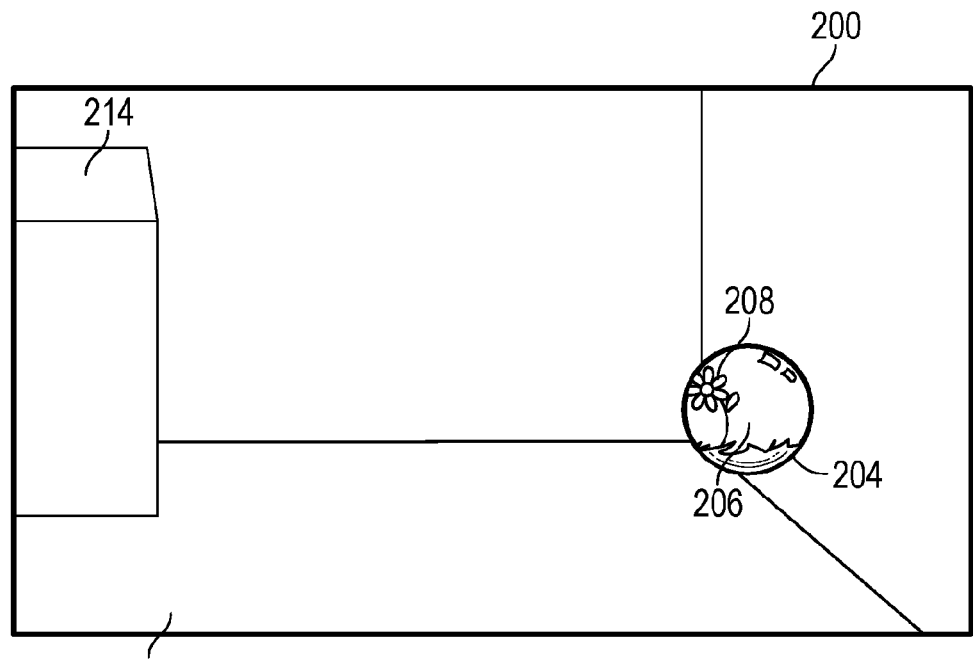
Figure 2D:
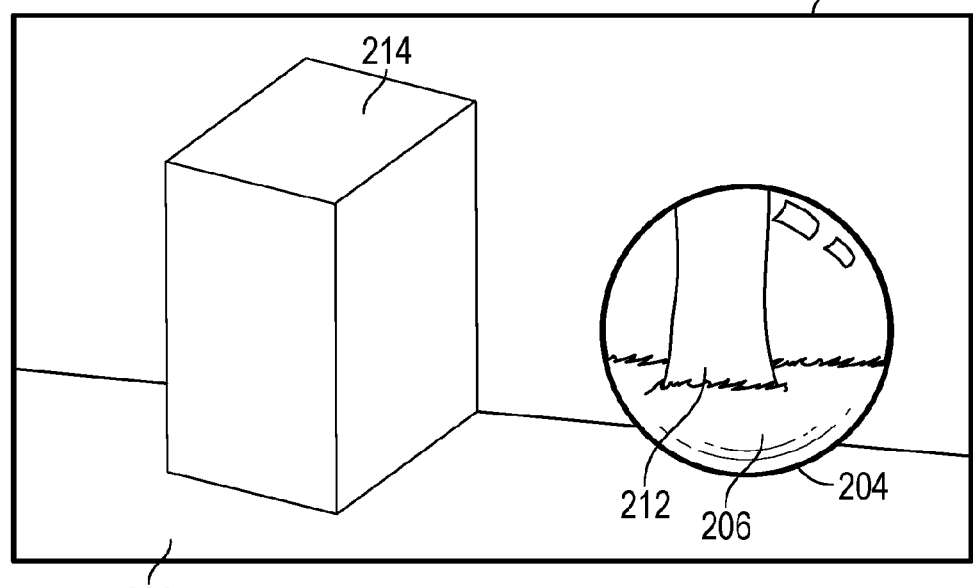
Figure 2E:
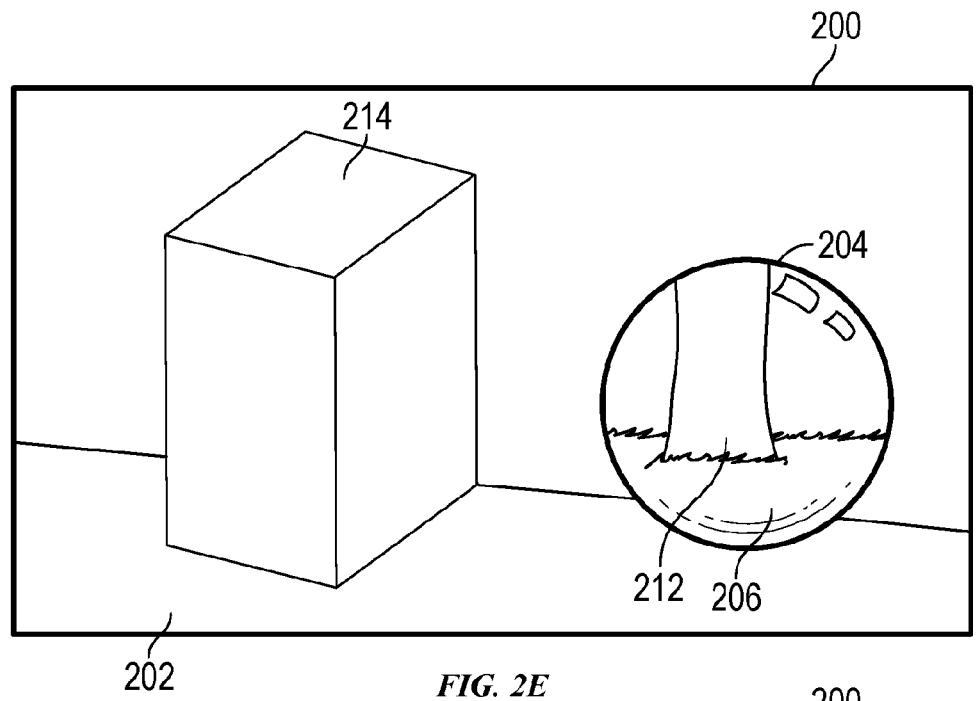
Figure 2F:
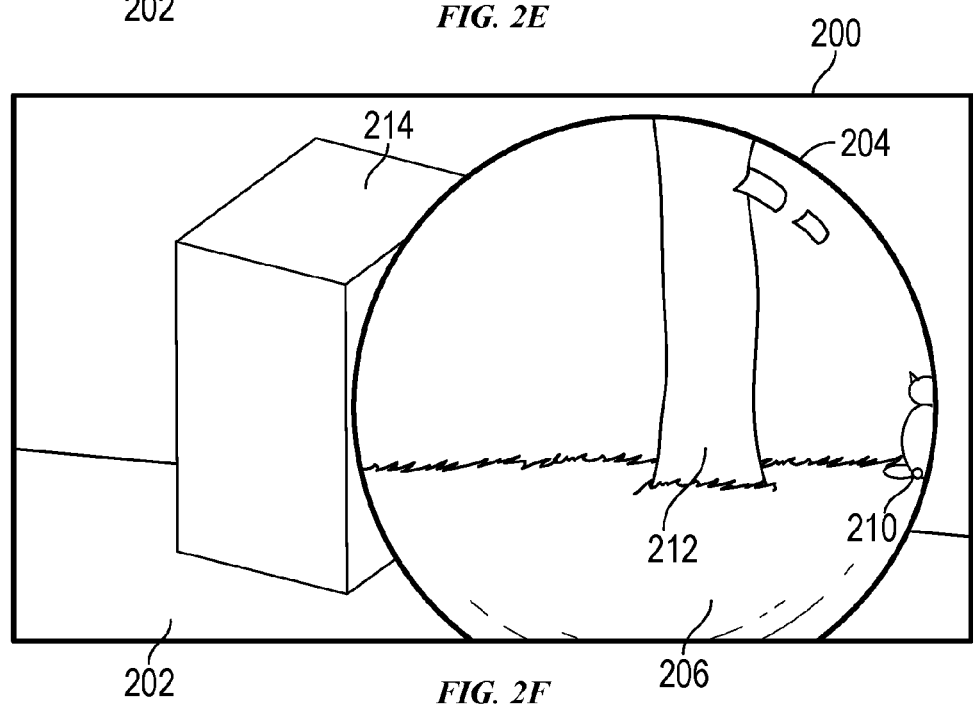
Figure 2G:
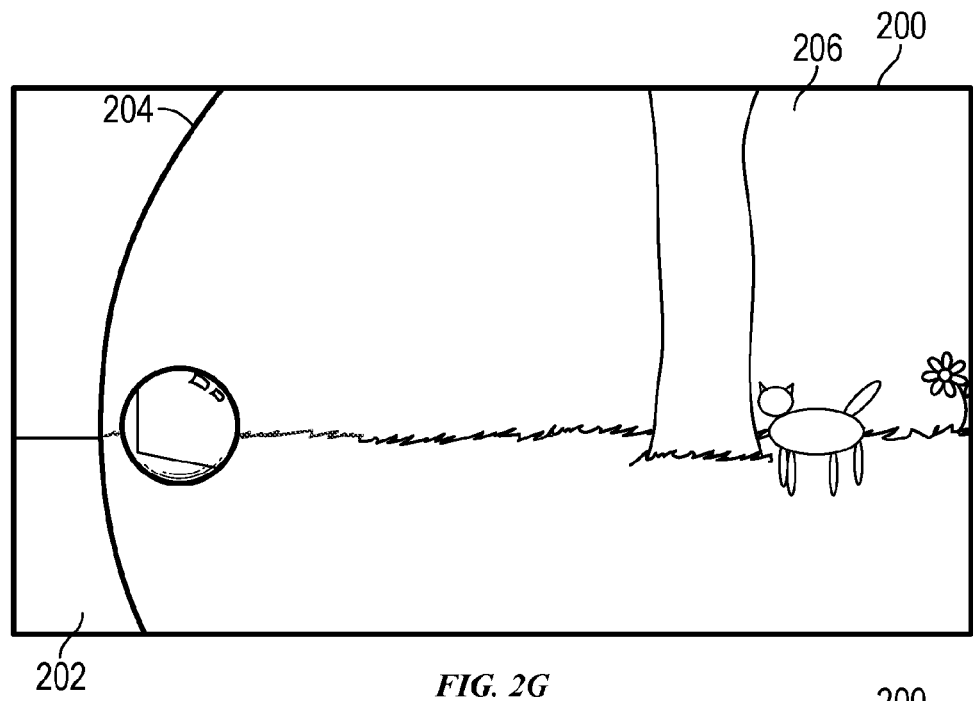

In some embodiments, a size of a view may be increased. For example, with reference to FIGS. 2A and 2B, user interface element 204 may be enlarged, for instance, in response to a user input indicating a request that the user interface element 204 be increased in size. In some embodiments, user interface element 204 is proportionally enlarged in accordance with a magnitude of movement of an object towards device 200. For example, movement of an object a relatively short distance towards device 200 may cause a relatively small enlargement of user interface element 204 (FIG. 2B), while movement of an object a relatively large distance towards device 200 may cause a relatively large enlargement of user interface element 204 (FIG. 2F).

While enlarging user interface element 204, view 206 may also be enlarged (e.g., proportionally enlarged). It will be appreciated that sizes of user interface elements and views refers, at least in some examples, to the displayed size of the user interface elements and views. Accordingly, by providing a larger user interface element, a user is provided with a larger view of another CSR location (e.g., a destination location). In some embodiments, enlarging a user interface element enlarges the display of a view, but does not change the view. Rather, a larger portion of the view is displayed in the enlarged user interface element. For example, as shown in FIG. 2B, destination view 206 is displayed in enlarged user interface element 204. View 206 in FIG. 2B includes at least a portion of view 206 shown in FIG. 2A. In particular, view 206 now includes flower 208 and additionally includes cat 210 (not previously in view 206 in FIG. 2A).

In some embodiments, a size of a view may be decreased. For example, with reference to FIGS. 2B and 2C, user interface element 204 in FIG. 2B may be shrunk, for instance, in response to a user input indicating a request that the user interface element 204 be decreased in size. In some embodiments, user interface element 204 is proportionally shrunk in accordance with a magnitude of movement of an object away from device 200. Accordingly, by providing a smaller user interface element, a user is provided with a smaller view of another CSR location. In some embodiments, shrinking a user interface element shrinks the display of a view, but does not change the view. Rather, a smaller portion of the view may be displayed in the shrunk user interface element. For example, view 206 is displayed in shrunken user interface element 204 in FIG. 2C. View 206 in FIG. 2C includes at least of portion of view 206 in FIG. 2B. In particular, view 206 includes flower 208.

In some embodiments, modifying display of a view includes determining a direction. For example, a second direction (e.g., a leftwards moved direction) is determined by device 200. The display of user interface element 204 is modified to depict the destination location from a second perspective determined from the second direction. In some embodiments, the second perspective is different from a current perspective (e.g., the first perspective of view 202 in FIGS. 2A and 2B). For example, as shown in FIGS. 2B and 2D, the display of user interface element 204 in FIG. 2B is modified to depict the backyard location from a second perspective (e.g., corresponding to a leftwards moved direction) in view 206 in FIG. 2D.

In some embodiments, while a destination location is depicted (e.g., in user interface element 204) from the second perspective, a current view depicting a current location continues to be displayed from the first perspective. For example, while the backyard location is depicted from the second perspective (e.g., view 206 in FIG. 2D), the current view of the living room location continues to be displayed from the first perspective (e.g., view 202 in FIG. 2B).

In some embodiments, while modifying a display of user interface element 204 to depict a destination location from the second perspective, a current view is modified. For example, the current view is modified to depict the current location from a third perspective (e.g., determined using the second direction). For example, referring to FIGS. 2B and 2D, while the display of user interface element 204 is being modified from FIG. 2B to FIG. 2D, view 202 is modified from FIG. 2B to FIG. 2D (depicting the living room location from the third perspective).

In some embodiments, a position (e.g., position on a display of device 202) of a user interface element remains constant while one or more views are modified. Specifically, in some embodiments, user interface element 204 is displayed using a plurality of pixels of electronic device 200. For example, user interface element 204 in FIG. 2B depicting the current location from a first perspective is displayed using the plurality of pixels. While the current view (e.g., view 202 in FIG. 2B) is modified (e.g., modified to view 202 in FIG. 2D) to depict the current location from the third perspective, user interface element 204 continues to be displayed using the plurality of pixels. For example, as shown by FIGS. 2B and 2D, the position of user interface element 204 is unchanged.

In some examples, a current view and a content (e.g., displayed content) of a user interface element are both panned based on a determined direction. In some examples, such panning occurs while modifying (e.g., enlarging) the display of a user interface element. For example, as shown in FIGS. 2A and 2D, device 200 determines the second direction corresponding to views 202 and 206 in FIG. 2D. While current view 202 in FIG. 2A is being modified to display view 202 in FIG. 2D (e.g., including enlarging user interface element 204), both current view 202 and the content of user interface element 204 in FIG. 2A are panned based on the determined direction to display views 202 and 206 in FIG. 2D. In this manner, a current view and a content of a user interface element can be modified (e.g., simultaneously modified) consistent with a changing direction. Such modification can improve user comfort when exploring CSR settings.

In some embodiments, user interface elements may be displaced (e.g., move) in a CSR setting. It will be appreciated that displacement of user interface elements refers to displacement of the display of the user interface element relative to the view in which the user interface element is displayed. Accordingly, in some embodiments, a user interface element may be displaced, but remain at the same or at a different position on a display (e.g., displayed using the same or different plurality of pixels). For example, with reference to FIGS. 2C and 2D, user interface element 204 may be moved to the left, for instance, in response to user input indicating a request that the user interface element move to the left. The moved user interface element 204 depicts the destination location from the second perspective determined using the second direction (e.g., view 206 in FIG. 2D). Accordingly, by moving a user interface element, a user can look around a destination location (e.g., view different portions of the second backyard location depicted by view 206). In some embodiments, displacing a user interface element does not change a view. Rather, a different portion of the view may be displayed in the displaced user interface element. For example, as shown in FIG. 2D, leftwards-moved user interface element 204 displays view 206 depicting the destination backyard location. View 206 includes tree 212 to the left of cat 210. View 206 does not include flower 208 or cat 210 as a result of the displacement.

As discussed, in some embodiments, displacement of a user interface element causes simultaneous displacement of the view in which the user interface element was previously displayed. In some embodiments, this is because the user's direction (e.g., representing the user's field of view) follows the moved user interface element, so the view in which the user interface element was previously displayed is modified to correspond to the moved direction. In other embodiments, this is because the user interface element follows a user's moved direction (e.g., the user provides input requesting a user interface element to move), so the view in which the user interface element was previously displayed is similarly modified to correspond to the moved direction. For example, as shown in FIGS. 2C and 2D, view 202 is modified to correspond to the leftwards moved direction corresponding to leftwards moved user interface element 204. For example, view 202 in FIG. 2D includes the entirety of chair 214, while view 202 in FIG. 2C only includes a portion of chair 214.

In FIG. 2D, it should be understood that the user has not moved from the location depicted by view 202 in FIG. 2C. Rather, as discussed, the direction of the user has changed (e.g., the user has turned his or her head and/or moved his or her eyes) so the views 202 and 206 are modified to correspond to the moved direction in FIG. 2D. However, in some embodiments, the user moves within a CSR setting, and a current view and a destination view depicted in a user interface element are simultaneously modified in a corresponding manner. For example, if the user moves forward from the current location depicted by view 202, views 202 and 206 are modified such that chair 214 and tree 212 appear closer to the user.

As described, providing movement of a user interface element allows a user in a current location to look around in a destination location. In particular, as user interface element 204 moves, the moved direction corresponding to the moved user interface element 204 is determined and destination view 206 displayed by user interface element 204 is updated to correspond to the moved direction. In some embodiments, the view in which the user interface element was previously displayed (e.g., current view 202 including user interface element 204 before it moved) is simultaneously modified to correspond to the moved direction. Thus, as the user looks around, a current view and a content of the user interface element depicting the destination location are synchronized (e.g., panned) according to the user's changing direction (FIGS. 2C and 2D). This can create a seamless and natural user interface for exploring CSR settings.

In some embodiments, a current view is replaced with a destination view. In some embodiments, a current view is replaced with a destination view in response to device 200 determining that movement of an object towards device 200 exceeds a threshold distance. In some embodiments, the destination view includes a portion of the destination view depicted by a user interface element in a current view. For example, with reference to FIGS. 2E-H, current view 202 may be replaced with destination view 206. As shown, such replacement teleports a user between a current location and a destination location in a CSR setting.

In some embodiments, teleportation occurs gradually. For example, as shown in FIGS. 2E-2H, user interface element 204 enlarges until view 206 has replaced view 202. View 206 in FIG. 2H no longer includes user interface element 204, and thus the user has teleported to the destination backyard location from the current living room location.

In some embodiments, teleportation occurs substantially instantaneously (e.g., instantaneous as perceived by the user). For example, in some embodiments, view 202 in FIG. 2E is replaced with view 206 in FIG. 2H without displaying enlargement of user interface element 204 (e.g., without displaying the views shown in FIGS. 2F and G).

In some embodiments, while a current view is being modified to display a destination view, the two views are maintained relative to each other. For example, as view 202 (FIG. 2E) is being modified to display view 206 in enlarged user interface element 204 (FIG. 2F), there is no relative movement between view 202 and view 206 so the views are stationary relative to each other. For example, neither chair 214 nor tree 212 is moving towards or away from the user. Nor is tree 212 moving closer or further from chair 214. The above discussion focuses on the relative movement of stationary virtual objects between the two views, because in some embodiments, non-stationary virtual objects in a view (e.g., cat 210) move relative to objects in the other view (e.g., chair 214) to provide the user a live view of both locations during the modification. In some embodiments, the movement of all virtual objects (e.g., stationary or non-stationary) in both views ceases during the modification.

Providing user teleportation in this manner can improve user comfort. Sometimes, perceived movement in a virtual setting (e.g., the view of a virtual setting is coming towards or moving away from the user) without corresponding user movement in the physical setting (e.g., the user is not moving forward or backward in his or her physical setting) causes user sensory discomfort. As the above described techniques maintain the current view and the destination view relative to each other during modifying the current view to display the destination view, the user does not perceive such movement within the virtual setting without corresponding physical movement, thus improving user comfort when teleporting between locations in a CSR setting. Accordingly, the systems and techniques described herein may not only provide a seamless and natural interface for exploring CSR settings, but also may improve usability of CSR systems.

Figure 2H:
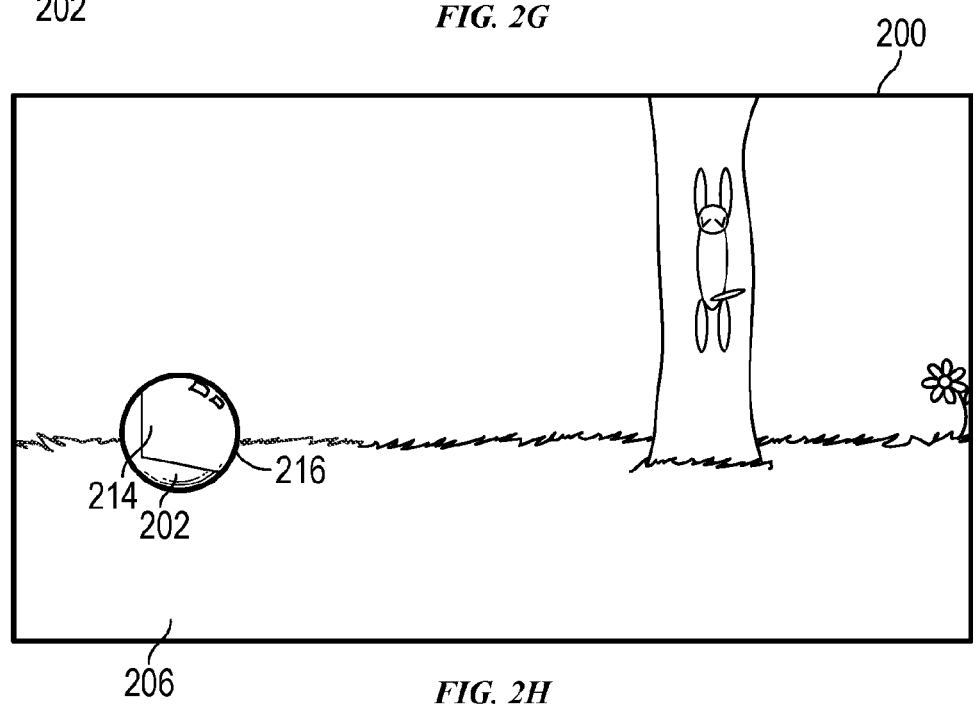

Turning now to FIG. 2H, the user is now teleported to the backyard location from the living room location, as described with reference to FIGS. 2E-H. In some embodiments, after teleporting to a destination location from a current location, the user teleports back to the original (e.g., current) location. In some embodiments, the user teleports back to the original location by interacting with a displayed user interface element depicting the original location. For example, as shown in FIG. 2H, user interface element 216 depicts view 202 of a portion of the living room location. View 202 includes a portion of the user's previous view of the living room location (e.g., view 202 includes chair 214). By interacting with user interface element 216, the user can teleport to the living room location (and/or modify view 206) according to any of the techniques discussed above.

Figure 3A:
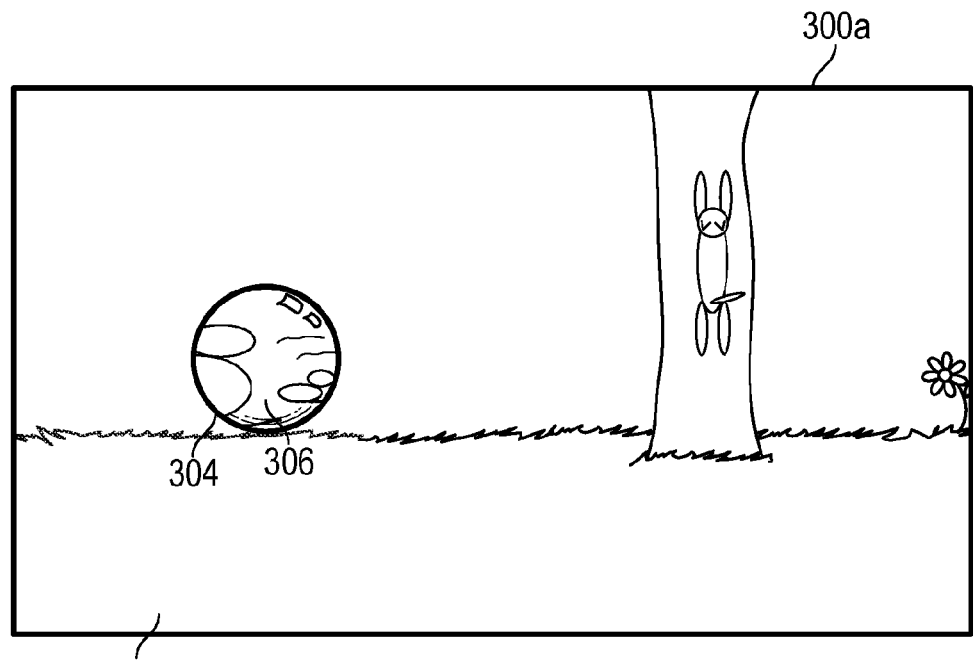
FIGS. 3A-3B illustrate exemplary views of a CSR setting.
Figure 3B:

Turning now to FIGS. 3A-B, exemplary techniques allowing for multiple users to teleport between each other's CSR settings are discussed.

FIG. 3A depicts exemplary view 302 of a current CSR setting (e.g., a backyard) displayed on a device 300a. In some embodiments, device 300a is used to implement device 200, discussed above. Device 300a is associated with a first user considered to be present in the current CSR setting. The first user is thus provided view 302 (e.g., a field of view) of the first (e.g., current) CSR setting. View 302 includes user interface element 304 displaying view 306 (e.g., an embedded view) of a second CSR setting (e.g., a duck pond).

In some embodiments, the direction corresponding to a displayed view (e.g., the direction corresponding to a perspective from which the view is displayed) is not the direction corresponding to the view displayed in the user interface element. For example, referring to FIG. 3A, the direction corresponding to view 302 is not the direction corresponding to view 306. The direction corresponding to view 306 may be fixed or may correspond to another user. For example, the direction corresponding to view 302 corresponds to the first user and the direction corresponding to view 306 is corresponds to a second user who is located in the second CSR setting. View 306 thus represents a portion of the view of the second user in some examples. The full view 306 of the second user (from a perspective corresponding to the direction of the second user) is shown in FIG. 3B. The full view 306 is displayed on an external electronic device 300*b* associated with the second user. In some examples, device 300*b* is used to implement device 200, discussed above.

In some embodiments, the first user teleports to the location of a second user. For example, referring to FIGS. 3A and B, the first user interacts with user interface element (e.g., by providing input as described above) 304 to teleport the first user from the backyard location to the duck pond location according to any of the techniques discussed above. For example, the view 302 displayed on device 300*a* is replaced with view 306. The above described techniques thus allow multiple users to share their respective views with each other through a user interface element. By interacting with the user interface element, users can preview each other's CSR settings and/or teleport between each other's CSR settings.

In some embodiments, to display a view corresponding to a direction, a direction is obtained from an external device and the view is determined using the obtained direction. For example, device 300*a* obtains the direction corresponding to view 306 from device 300*b* and determines view 306 using the obtained direction.

With reference now to FIGS. 4A-E, exemplary techniques for moving about a CSR setting are described.

Figure 4A:
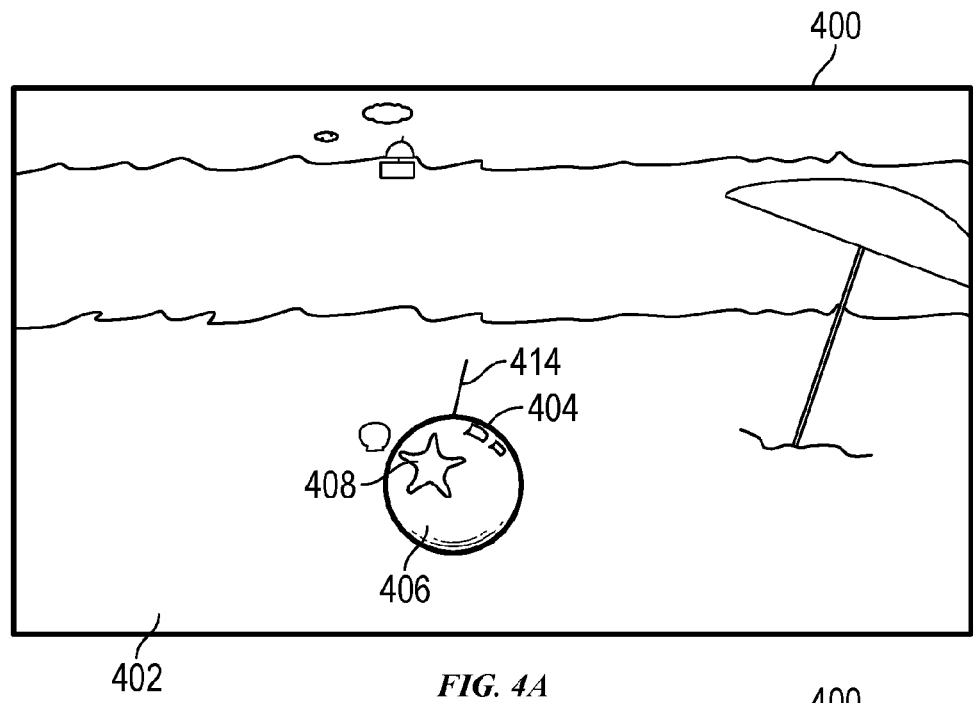
FIGS. 4A-4E illustrate exemplary views of a CSR setting.

FIG. 4A illustrates a current view 402 of a CSR setting displayed on a device 400 associated with a user. In some embodiments, device 400 is the same as or similar to device 100*a*, 100*b*, or 100*c* described above. The current view depicts a current location (e.g., a location on a beach) of the CSR setting. The user is considered to be present in the CSR setting, and is therefore provided current view 402 of the CSR setting. View 402 includes user interface element 404. User interface element 404 depicts a destination location of the CSR setting. For example, user interface element displays view 406, depicting a destination location a short distance from (e.g., in front of) the current location.

In some embodiments, a destination location depicted (e.g., as view 406) in user interface element 404 is displayed at a larger scale. For example, the destination location displayed as view 406 is displayed at a larger scale relative to the display of the current location in the current view (e.g., view 402). For example, starfish 408 in view 406 is displayed at a larger scale relative to the display of the shell in view 402.

In some embodiments, a scale (e.g., magnification scale) of content displayed in user interface element 404 is determined using a gaze depth. For example, device 400 determines a direction corresponding to a view and determines a gaze depth corresponding to the direction. In FIG. 4A, the determined gaze depth corresponding to view 406 is relatively shallow (e.g., because a user is looking towards the ground at starfish 408). In some embodiments, based on the relatively shallow gaze depth, device 400 determines a relatively small magnification scale for content displayed in user interface element 404. In some embodiments, based on a relatively deep gaze depth, device 400 determines a relatively large magnification scale for content displayed in user interface element 404. For example, referring to FIG. 4C, the gaze depth corresponding to view 406 is relatively deep (e.g., because a user is looking at boat 412 on the horizon) and thus device 400 determines a relatively large magnification scale for view 406 in FIG. 4C. Accordingly, in some embodiments, a scale for content displayed in user interface element 404 increases proportional to increasing gaze depth. In some embodiments, a scale for content displayed in user interface element 404 decreases proportional to increasing gaze depth.

In some embodiments, a scale (e.g., magnification scale) of content displayed in user interface element 404 is based on a distance between one or more virtual objects represented by the content and a current location. For example, referring to FIGS. 4A and 4C, the difference in the magnification in view 406 between FIGS. 4A and 4C is because the distance between the current location and starfish 408 is less than the distance between the current location and boat 412. This allows for virtual objects that are further away from a user to be more magnified compared to virtual objects that are closer to the user.

In FIG. 4A, the user is in a current location in the CSR setting and has a first determined direction. View 402 thus depicts the current location of the CSR setting from a first perspective corresponding to the first determined direction. In some embodiments, device 400 determines a second perspective using the first determined direction and displays view 406 from the second perspective. Thus, in some embodiments, view 406 represents a portion of what would be displayed to the user if the user were at the destination location and had the first determined direction.

As discussed, a view can be modified by enlarging the view, shrinking the view, moving the view, and/or by replacing the view with another view (e.g., teleporting). In some embodiments, such modification occurs responsive to receiving input representing selection of a user interface element associated with the view. Techniques for modifying display of the views shown in FIGS. 4A-E discussed below are analogous to the techniques discussed above for modifying the views shown in FIGS. 2A-H, and FIGS. 3A-B.

As discussed, in some embodiments, modifying a view can include modifying user interface element associated with the view. In some embodiments, while a user interface element is being modified, the content of the user interface element is displayed at a constant scale. For example, while user interface element 404 in FIG. 4A shrinks or enlarges, the content of user interface element 404 (e.g., starfish 408) remains displayed at a same scale.

Figure 4B:
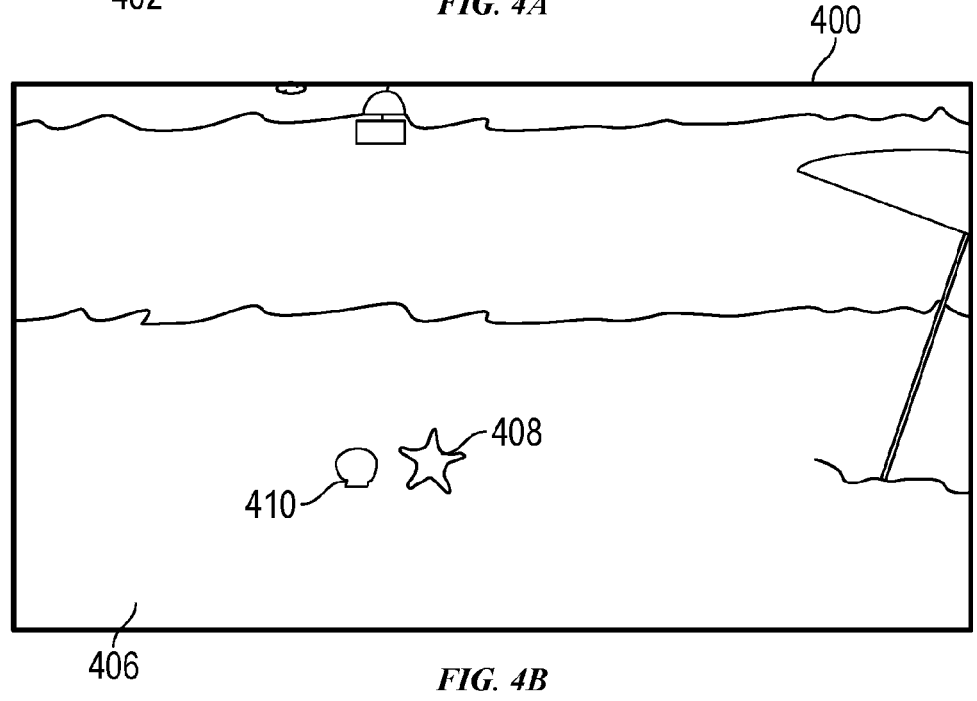
Figure 4C:
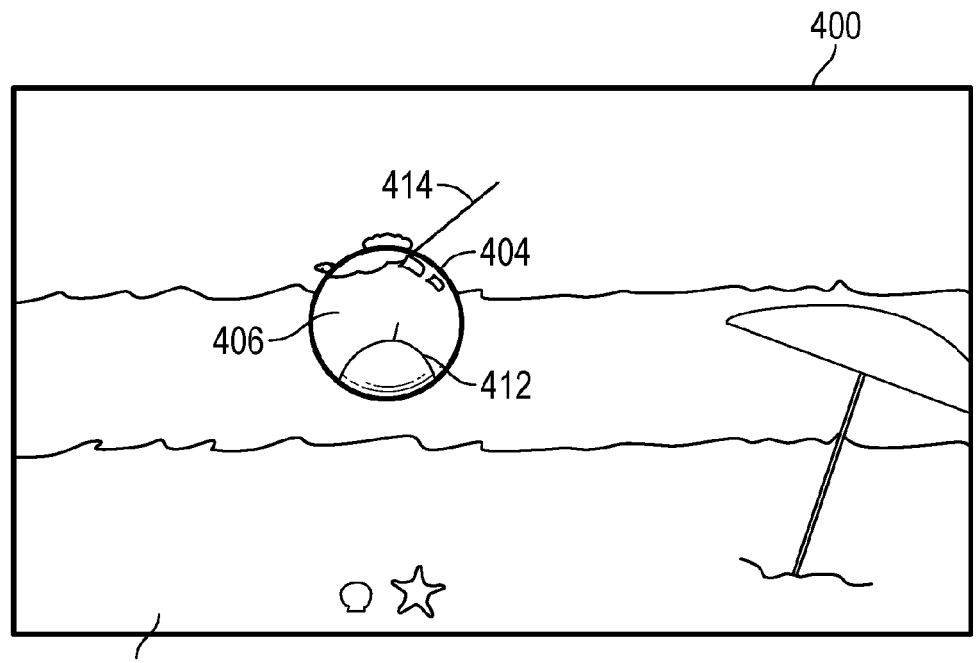

FIG. 4B shows an exemplary modification of view 402 (FIG. 4A). In particular, current view 402 is modified by replacing view 402 with destination view 406 in FIG. 4B, for instance, in response to user input requesting view 402 to be replaced. As shown, in some embodiments, the destination location displayed in user interface element 404 (e.g., view 406 in FIG. 4A) and the destination view 406 in FIG. 4B are displayed from perspectives determined from a common determined direction. As further shown, in some embodiments, view 406 in FIG. 4A is the same scale as view 406 in FIG. 4B. FIG. 4B thus shows that the user has teleported to the destination location from the current location (e.g., the user has teleported a short distance from the current location to see starfish 408 and shell 410 more closely).

FIG. 4C shows an exemplary modification of view 402 (FIG. 4A). In FIG. 4C, user interface element 404 and the user's direction have moved upward but the user has not moved from the current location. In FIG. 4C, the destination location depicted in user interface element 404 is displayed from a third perspective. For example, device 400 determines a second direction (e.g., an upwards moved direction) different from the first determined direction and determines the third perspective using the determined second direction. User interface element 404 thus displays the destination location from the third perspective. For example, view 406 in FIG. 4C includes boat 412.

Additionally, as shown in FIG. 4C, the current view (e.g., view 402) is modified to display the current location from a fourth perspective determined using the second direction. In particular, view 402 has been modified to include more of the sky. In some embodiments view 402 (and view 406) are modified because the user's direction has moved upward (e.g., the user has looked upwards and/or tilted his or her head upward). View 406 in FIG. 4C thus represents a portion of what would be displayed to the user if the user were at the destination location and had the upward moved direction.

Further, as shown in FIG. 4C, the scale of view 406 has increased from FIG. 4A. As discussed, in some embodiments, this difference in scale is because view 406 in FIG. 4A corresponds to a relatively shallow gaze depth, while view 406 in FIG. 4C corresponds to a relatively deep gaze depth. Thus, in some embodiments, input representing selection of a more magnified view (corresponding to further away virtual objects) causes further teleportation, as now discussed with respect to FIGS. 4B and 4E.

In some embodiments, interacting with user interface element 404 in FIG. 4C teleports the user further than interacting with user interface element 404 in FIG. 4A. In particular, interacting with user interface element 404 in FIG. 4A may teleport the user a short distance (FIG. 4B) to the destination location depicted by view 406 in FIG. 4B to see starfish 408 and shell 410 more closely. In contrast, interacting with user interface element 404 in FIG. 4C may teleport the user a long distance to the destination location depicted by view 406 in FIG. 4E to see boat 412 more closely. FIGS. 4A and 4C thus demonstrate that moving user interface element 404 (e.g., by looking upward) to depict objects further away from the user allows the user to teleport further from a current location.

Figure 4D:
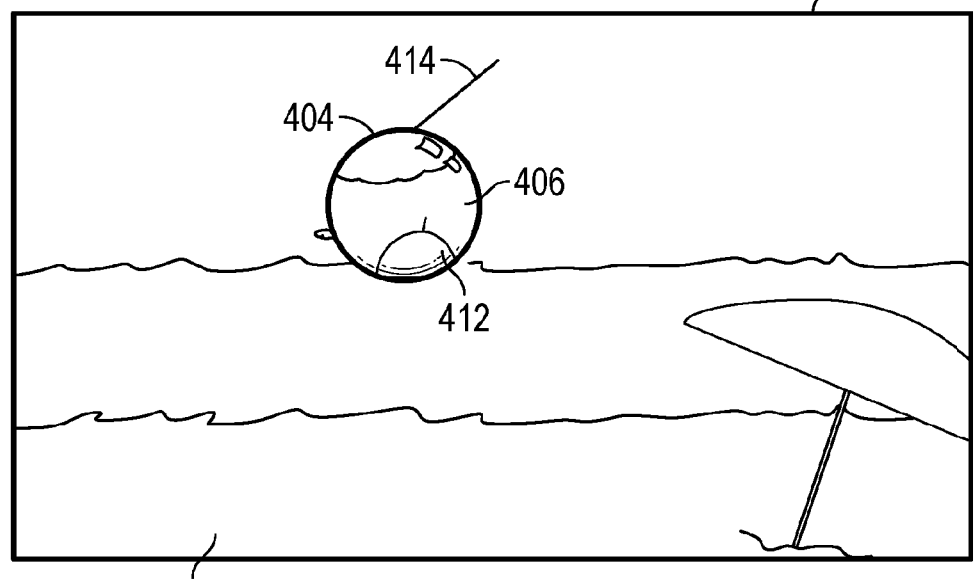

FIG. 4D depicts an exemplary modification of view 402 in FIG. 4C. In particular, view 402 of FIG. 4D depicts a current location from a perspective corresponding to a direction different from the direction corresponding to view 402 of FIG. 4C. As shown, from FIG. 4C to FIG. 4D, a user's direction has moved upward, and views 402 and 406 of FIG. 4C have both been updated to correspond to the upward moved direction. In some embodiments, while view 402 in FIG. 4C is being modified to view 402 of FIG. 4D, the position (e.g., on a display of device 400) of user interface element 404 remains constant. For example, the same pixels of a display of device 400 are used to display user interface element 404 between FIGS. 4C and 4D.

In some embodiments, a current view and the content of a user interface element are panned based on a determined direction. For example, view 402 and 406 in FIG. 4C are panned based on the upward moved direction corresponding to view 402 in FIG. 4D. In some embodiments, such panning occurs while the display of user interface element 404 in FIG. 4C is enlarged (e.g., between FIGS. 4C and 4D, user interface element 404 enlarges responsive to receiving input representing selection of it).

In some embodiments, an indicator associated with a user interface element is displayed. In some embodiments, the indicator includes a line, a two or three-dimensional shape, an icon, or any combination thereof. In some embodiments, the indicator is displayed adjacent to (e.g., above, below, to the left/right of, etc.) the user interface element. In some embodiments, the indicator is displayed within the user interface element. For example, FIG. 4A shows that a line is displayed above a user interface element (e.g., line 414 in FIG. 4A).

In some embodiments, an indicator has a dimension (e.g., length, width, height, volume, area, color). As discussed below, in some embodiments, a dimension of the indicator (e.g., the length of line 414) corresponds to the user's determined direction, gaze depth, and/or the scale of the view displayed in the user interface element. In some embodiments, a dimension of the indicator represents the distance between the user's current location and a destination location depicted by the user interface element. The indicator can thus provide a helpful visual guide for navigating within a virtual setting.

In some embodiments, a dimension of the indicator is based on a determined gaze depth and/or a determined direction. For example, in FIG. 4A, line 414 is relatively short because the user's gaze depth is relatively shallow and/or the user's direction is towards the ground (e.g., the user is looking downwards at the sand of the beach). In contrast, in FIG. 4C, line 414 is relatively long because the user's gaze depth is relatively deep and/or the user's direction is towards the horizon (e.g., the user is looking forward into the horizon formed by the ocean and sky).

In some embodiments, a dimension of the indicator is based on a scale of the view displayed in the user interface element. For example, in FIG. 4A, line 414 is relatively short because the scale of view 406 is relatively small. In contrast, in FIG. 4C, line 414 is relatively long because the scale of view 406 is relatively large.

In some embodiments, a dimension of the indicator is based on a distance between a current location and the destination location. For example, in FIG. 4A, the length of line 414 is relatively short because, as discussed, the distance between the current location and the destination location (e.g., the location depicted by FIG. 4B) is relatively short. In contrast, in FIG. 4C, the length of line 414 is relatively long because, as discussed, the distance between the current location and the destination location (e.g., the location depicted by FIG. 4E) is relatively large.

In some embodiments, a value of a dimension (e.g., a value for a length, width, height, or any combination thereof) has a maximum value, and the maximum value corresponds to a maximum virtual distance between a current location and a destination location. The maximum value thus corresponds to a maximum teleportation distance allowed within a CSR setting. Having a maximum teleportation distance prevents a user from looking into the horizon (or sky) and teleporting an effectively infinite distance (i.e., no destination point associated with a virtual object located a finite distance away). The maximum value (e.g., maximum length of a line) is shown by the length of line 414 in FIG. 4C, for example. Because in some embodiments, the length of line 414 represents a scale of the destination location displayed in the user interface element, a maximum length line length corresponds to a maximum degree of magnification so that view 406 in FIG. 4C is displayed at a maximum scale.

FIG. 4D further demonstrates maximum scale corresponding to a maximum value of a dimension. In particular, as discussed, FIG. 4D depicts view 402 displayed on device 400 responsive to device 400 determining that a user's direction has moved upward. Because the user's direction has moved upward (and/or the user's gaze depth has increased), in some embodiments, the scale of view 406 in FIG. 4D should increase relative to the scale of view 406 in FIG. 4C. However, because in some examples, view 406 in FIG. 4C is maximally magnified, the magnification of view 406 remains the same. Similarly, the length of line 414 remains the same between FIGS. 4C and 4D.

Because the magnification of view 406 remains the same between FIGS. 4C and 4D, view 406 depicts the same location (i.e., the destination location) in FIGS. 4C and 4D. Thus, in some embodiments, interacting with user interface element 404 displaying view 406 in both FIGS. 4C and 4D teleport the user the same maximal virtual distance. In this way, a maximal teleportation distance is set between two locations, preventing a user from teleporting an effectively infinite distance (e.g., teleporting infinitely into the horizon defined by the ocean and the sky). As discussed, this maximal teleportation distance can be indicated by a value of a dimension of a visual indicator (e.g., if the user gazes upwards and the line length no longer increases, it is indicated to the user that the maximal teleportation distance has been set).

Figure 4E:
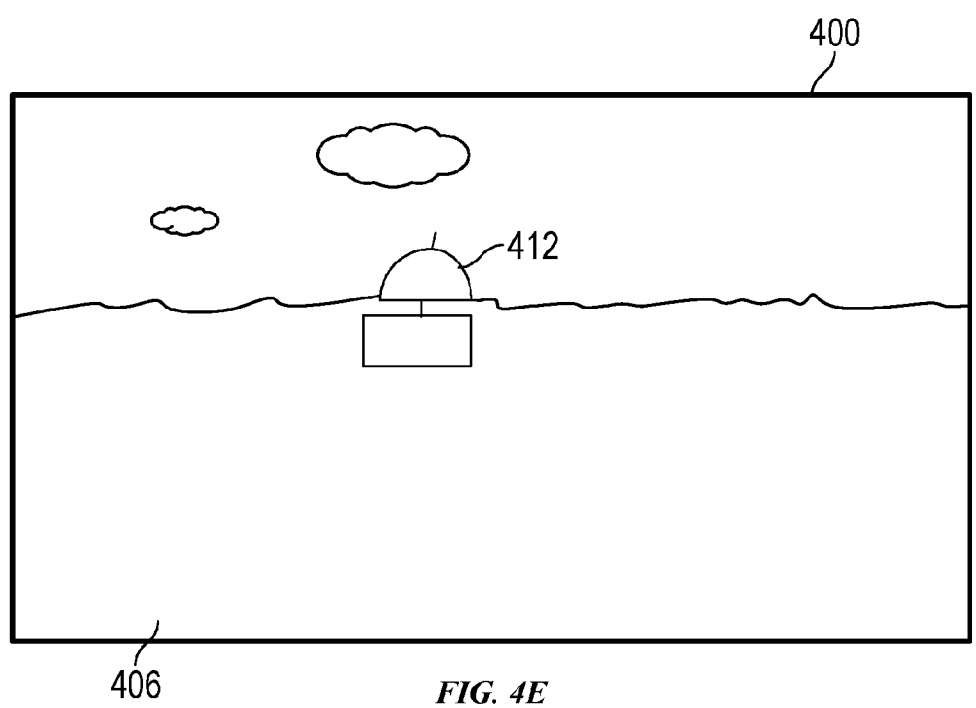

Turning now to FIG. 4E, a user has now teleported the maximal distance within the CSR setting in response to interacting with user interface element 404. In particular, FIG. 4E depicts view 406 displayed on device 400 responsive to the user interacting with user interface element 404 in FIG. 4D, for instance. View 406 in FIG. 4E corresponds to the direction and scale of view 406 in FIG. 4D. For example, both FIG. 4D and FIG. 4E include boat 412 and boat 412 has the same scale between the two views. As discussed, in some embodiments, while view 402 is being modified to display view 406 (e.g., user interface element 404 expands in view 402 to display more and more of view 406), view 402 is maintained relative to view 406. For example, while view 402 is being modified, boat 412 in view 406 is not moving relative to any stationary virtual object (e.g., the umbrella) in view 402. As discussed, such maintaining of the two views may improve user comfort when moving about a CSR setting.

It should be recognized that the embodiments discussed above with respect to FIGS. 2-4 are exemplary and are not intended to be limiting. For example, although the embodiments in FIGS. 2-4 are described with respect to one or more virtual settings, the techniques can be applied analogously to augmented reality or mixed reality applications. For example, in some embodiments, a displayed view (e.g., 202) depicts a physical location (e.g., displayed using video pass-through) and the displayed view includes a user interface element (e.g., 204) as a virtual object. User interface element can depict a virtual location (e.g., 206). Accordingly, in some embodiments, a user interacts with a user interface element to teleport the user from a physical setting to a virtual setting. In other embodiments, a user interacts with a user interface element to teleport the user from a virtual setting to a physical setting. For example, in some embodiments, view 202 depicts a virtual location and view 206 depicts a physical location.

Figure 5:
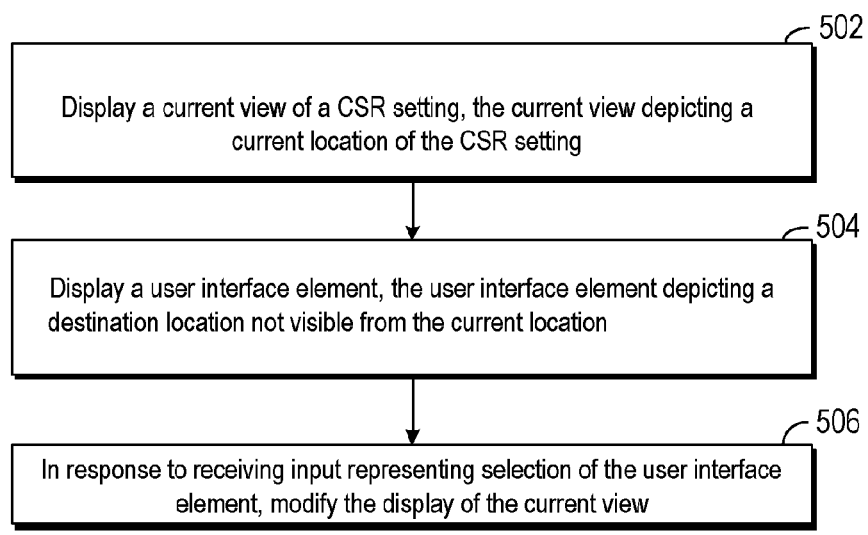
FIG. 5 illustrates a process for moving about a CSR setting.

Turning now to FIG. 5, a flow chart of exemplary process 500 for moving about a CSR setting is depicted. In some embodiments, process 500 is performed using a user device (e.g., 100a, 100b, 100c, 200, 300a, 300b, or 400). The user device is, for example, a handheld mobile device, a head-mounted device, or a head-up device. It should be recognized that, in other embodiments, process 500 performed using two or more electronic devices (e.g., device 100b and device 100c). In these embodiments, the operations of process 500 are distributed in any manner between the two or more devices. Further, it should be appreciated that the display of the user device can be transparent or opaque. It should also be appreciated that process 500 can be applied to virtual reality, augmented reality, or mixed reality applications and to effects that include visible features as well as non-visible features, such as audio, haptic, or the like. Although the blocks of process 500 are depicted in a particular order in FIG. 5, it should be appreciated that these blocks can be performed in other orders. Further, one or more blocks of process 500 can be optional and/or additional blocks can be performed.

At block 502, a current view (e.g., view 202 of FIG. 2A) of a CSR setting is displayed (e.g., at an electronic device). The current view depicts a current location of the CSR setting from a first perspective corresponding to a first determined direction. In some embodiments, the electronic device includes a head-mounted display having a head facing sensor. In some embodiments, gaze data representing eye gaze is obtained using the head facing sensor. In some embodiments, the first determined direction is determined using the obtained gaze data.

At block 504, a user interface element (e.g., 204) is displayed. The user interface element depicts a destination location not visible from the current location (e.g., user interface element displays view 206 in FIG. 2A). In some embodiments, the user interface element is spherical. In some embodiments, depicting the destination location includes displaying, in the user interface element, movement of one or more virtual objects located at the destination location.

At block 506, in response to receiving input representing selection of the user interface element, the display of the current view is modified to display a destination view (e.g., view 206 in FIG. 2B) depicting the destination location. In some embodiments, modifying the display of the current view to display the destination view includes enlarging the user interface element. In some embodiments, while the display of the user interface element is enlarged, the current view and the content of the user interface element are panned based on a determined direction (e.g., views 202 and 206 are panned between FIG. 2A and FIG. 2D).

In some embodiments, the first determined direction is a direction corresponding to a first user, and the destination view depicts the destination location from a fourth perspective corresponding to a determined direction corresponding to a second user different from the first user, the second user being located at the destination location.

In some embodiments, modifying the display of the current view to display the destination view includes determining whether the received input represents movement of an object towards the electronic device. In some embodiments, in response to determining that the received input represents movement of the object towards the electronic device, the user interface element is proportionally enlarged in accordance with a magnitude of the movement. In some embodiments, modifying the display of the current view to display the destination view includes determining whether the movement of the object exceeds a threshold distance. In some embodiments, in response to determining that the movement of the object exceeds the threshold distance, the display of the current view is replaced with a display of the destination view (e.g., view 202 in FIG. 2E is replaced by view 206 in FIG. 2H).

In some embodiments, after replacing the display of the current view with the display of the destination view, a second user interface element (e.g., 214) is displayed. The second user interface element depicts the current location. In some embodiments, in response to receiving input representing selection of the second user interface element, the display of the destination view is modified to display a view of the current location (e.g., view 202 in FIG. 2H). In some embodiments, modifying the display of the destination view to display the view of the current location includes replacing the display of the destination view with a display of the view of the current location.

In some embodiments, prior to receiving the input representing selection of the user interface element, a second direction different from the first determined direction is determined. In some embodiments, the display of the user interface element is modified to depict the destination location from a second perspective determined using the second direction (e.g., view 206 in FIG. 2B is modified to view 206 in FIG. 2D). In some embodiments, modifying the display of the user interface element includes displacing the user interface element, where the displaced user interface element depicts the destination location from the second perspective. In some embodiments, while the destination location is depicted from the second perspective in the user interface element, the current view depicting the current location of the CSR setting from the first perspective (e.g., view 202 in FIG. 2B) continues to be displayed.

In some embodiments, while modifying the display of the user interface element to depict the destination location from the second perspective, the current view is modified to depict the current location of the CSR setting from a third perspective determined using the second direction (e.g., view 202 is modified between FIGS. 2A and 2D).

In some embodiments, displaying the user interface element includes displaying the user interface element using a plurality of pixels of a display of the electronic device. In some embodiments, while modifying the current view to depict the current location of the CSR setting from the third perspective, the user interface element continues to be displayed using the plurality of pixels used to display the user interface element when the current view depicted the current location of the CSR setting from the first perspective (e.g., the pixels used to display user interface element 204 in FIGS. 2A (and/or 2B) are also used to display user interface element 204 in FIG. 2D).

Figure 6:
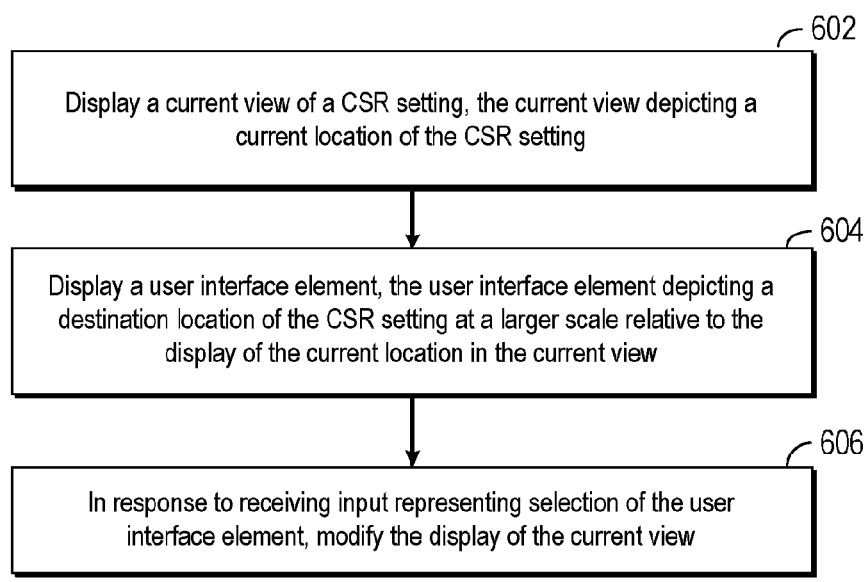
FIG. 6 illustrates a process for moving about a CSR setting.

Turning now to FIG. 6, a flow chart of exemplary process 600 for moving about a CSR setting is depicted. In some embodiments, process 600 is performed using a user device (e.g., 100a, 100b, 100c, 200, 300a, 300b, or 400). The user device is, for example, a handheld mobile device, a head-mounted device, or a head-up device. It should be recognized that, in other embodiments, process 600 performed using two or more electronic devices (e.g., devices 100b and 100c). In these embodiments, the operations of process 600 are distributed in any manner between the two or more devices. Further, it should be appreciated that the display of the user device can be transparent or opaque. It should also be appreciated that process 600 can be applied to virtual reality, augmented reality, or mixed reality applications and to effects that include visible features as well as non-visible features, such as audio, haptic, or the like. Although the blocks of process 600 are depicted in a particular order in FIG. 6, it should be appreciated that these blocks can be performed in other orders. Further, one or more blocks of process 600 can be optional and/or additional blocks can be performed. Additionally, any of the embodiments described above with respect to FIG. 5 can be included in process 600. Similarly, any of the embodiments described below with respect to FIG. 6 can be included in process 500.

At block 602, a current view of a CSR setting is displayed (e.g., view 402 in FIG. 4A or FIG. 4C). The current view depicts a current location of the CSR setting from a first perspective corresponding to a first determined direction. In some embodiments, the current view is displayed by an electronic device. In some embodiments, the electronic device includes a head-mounted display having a head-facing sensor. In some embodiments, gaze data representing eye gaze is obtained using the head-facing sensor and the first determined direction is determined using the obtained gaze data.

At block 604, a user interface element (e.g., 404) is displayed. The user interface element depicts a destination location of the CSR setting. The destination location, when displayed in the user interface element (e.g., a view 406 in FIG. 4A), is displayed at a larger scale relative to the display of the current location in the current view. In some embodiments, a first gaze depth associated with the first determined direction is determined and the larger scale of the content of the user interface element is determined using the first determined gaze depth.

In some embodiments, a second gaze depth associated with the first determined direction is determined. The second gaze depth can be the same as or different from the first gaze depth. In some embodiments, an indicator associated with the user interface element (e.g., 414) is displayed, the indicator having a dimension corresponding to the determined second gaze depth. In some embodiments, an indicator associated with the user interface element is displayed, the indicator having a dimension representing the distance between the current location and the destination location in the CSR setting. In some embodiments, a value of the dimension representing the distance between the current location and the destination location is a maximum value representing a maximum distance between the current location and the destination location. In some embodiments, the display of the destination location in the user interface element is displayed at a maximum scale.

At block 606, in response to receiving input representing selection of the user interface element, the display of the current view is modified to display a destination view (e.g., view 406 in FIG. 4B or FIG. 4D) of the CSR setting, the destination view depicting the destination location displayed in the user interface element. The destination location, when displayed in the destination view, is displayed at the same scale as the display of the destination location in the user interface element.

In some embodiments, modifying the display of the current view to display the destination view includes enlarging the display of the user interface element. In some embodiments, while enlarging the display of the user interface element, the current view and the content of the user interface element are panned based on a fourth direction different from the first determined direction (e.g., views 402 and 404 are panned between FIGS. 4C and 4D).

In some embodiments, modifying the display of the current view to display the destination view includes determining whether the received input represents movement of an object towards the electronic device. In some embodiments, in response to determining that the received input represents movement of the object towards the electronic device, the user interface element is proportionally enlarged in accordance with a magnitude of the movement of the object. In some embodiments, modifying display of the current view to display the destination view includes determining whether the movement of the object exceeds a threshold distance. In some embodiments, in response to determining that the movement of the object exceeds the threshold distance, the display of the current view is replaced with a display of the destination view (e.g., view 402 in FIG. 4A is replaced by view 406 of FIG. 4B).

In some embodiments, modifying the display of the current view to display the destination view comprises modifying the display of the user interface element. The content of the user interface element is displayed at the larger scale when the display of the user interface element is being modified.

In some embodiments, the destination location displayed in the user interface element and in the destination view are from perspectives determined from a common determined direction (e.g., view 406 in FIG. 4A and FIG. 4B are from a perspectives determined from a common direction). In some embodiments, a second perspective is determined using the first determined direction. In some embodiments, displaying the user interface element includes, displaying, in the user interface element, the destination location from the second perspective (e.g., view 406 in FIG. 4A is from the second perspective).

In some embodiments, a second direction different from the first determined direction is determined and a third perspective is determined using the determined second direction. In some embodiments, displaying the user interface element includes displaying, in the user interface element, the destination location of the CSR setting from the third perspective (e.g., view 406 in FIG. 4D is displayed from the third perspective). In some embodiments, the display of the current view is modified to display the current location of the CSR setting from a fourth perspective determined using the determined second direction (e.g., view 402 is modified between FIGS. 4C and 4D).

In some embodiments, displaying the user interface element includes displaying the user interface element at a plurality of pixels of a display of the electronic device. In some embodiments, while modifying the display of the current view (e.g., view 402 is modified between FIGS. 4C and 4D) to display the current location of the CSR setting from the fourth perspective, the user interface element continues to be displayed using the plurality of pixels used to display the user interface element when the current view depicted the current location of the CSR setting from the first perspective.

Executable instructions for performing the features of methods 500 and/or 600 described above are, optionally, included in a transitory or non-transitory computer-readable storage medium (e.g., memory(ies) 106) or other computer program product configured for execution by one or more processors (e.g., processor(s) 102).

Aspects of the techniques described above contemplate the possibility of gathering and using personal information to improve user experience when moving about CSR settings. Such information should be collected with the user's informed consent.

Entities handling such personal information will comply with well-established privacy practices and/or privacy policies (e.g., that are certified by a third-party) that are (1) generally recognized as meeting or exceeding industry or governmental requirements, (2) user-accessible, (3) updated as needed, and (4) compliant with applicable laws. Entities handling such personal information will use the information for reasonable and legitimate uses, without sharing or selling outside of those legitimate uses.

However, users may selectively restrict access/use of personal information. For example, users can opt into or out of collection of their personal information. In addition, although aspects of the techniques described above contemplate use of personal information, aspects of the techniques can be implemented without requiring or using personal information. For example, if location information, usernames, and/or addresses are gathered, they can be generalized and/or masked so that they do not uniquely identify an individual.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method for moving about a computer simulated reality (CSR) setting, the method comprising:
   at an electronic device with one or more processors and memory:
      displaying a current view of the CSR setting, the current view depicting a current location of the CSR setting from a first perspective corresponding to a first determined direction;
      while displaying the current view of the CSR setting, displaying a user interface element, the user interface element depicting a destination location not visible from the current location; and
      in response to receiving input representing selection of the user interface element, modifying the display of the current view to display a destination view depicting the destination location,
         wherein modifying the display of the current view to display the destination view comprises enlarging the user interface element.

2. The method of claim 1, further comprising prior to receiving the input representing selection of the user interface element:
   determining a second direction different from the first determined direction; and
   modifying the display of the user interface element to depict the destination location from a second perspective determined using the second direction.

3. The method of claim 1, wherein modifying the display of the current view to display the destination view comprises:
   determining whether the received input represents movement of an object towards the electronic device; and
   in response to determining that the received input represents movement of the object towards the electronic device, proportionately enlarging the user interface element in accordance with a magnitude of the movement.

4. The method of claim 3, wherein modifying the display of the current view to display the destination view comprises:
   determining whether the movement of the object exceeds a threshold distance;
   in response to determining that the movement of the object exceeds the threshold distance, replacing the display of the current view with a display of the destination view.

5. An electronic device, comprising:
   one or more processors; and
   memory storing one or more programs configured to be executed by the one or more processors, the one or more programs including instructions for:

displaying a current view of a CSR setting, the current view depicting a current location of the CSR setting from a first perspective corresponding to a first determined direction;

while displaying the current view of the CSR setting, displaying a user interface element, the user interface element depicting a destination location not visible from the current location; and in response to receiving input representing selection of the user interface element, modifying the display of the current view to display a destination view depicting the destination location, wherein modifying the display of the current view to display the destination view comprises enlarging the user interface element.

6. The electronic device of claim 5, wherein the one or more programs further include instructions for:

prior to receiving the input representing selection of the user interface element:

determining a second direction different from the first determined direction; and modifying the display of the user interface element to depict the destination location from a second perspective determined using the second direction.

7. The electronic device of claim 6, wherein modifying the display of the user interface element comprises displacing the user interface element, wherein the displaced user interface element depicts the destination location from the second perspective.

8. The electronic device of claim 6, wherein the one or more programs further include instructions for:

while modifying the display of the user interface element to depict the destination location from the second perspective:

modifying the current view to depict the current location of the CSR setting from a third perspective determined using the second direction.

9. The electronic device of claim 8, wherein displaying the user interface element comprises displaying the user interface element using a plurality of pixels of a display of the electronic device, and wherein the one or more programs further include instructions for:

while modifying the current view to depict the current location of the CSR setting from the third perspective:

continuing to display the user interface element using the plurality of pixels used to display the user interface element when the current view depicted the current location of the CSR setting from the first perspective.

10. The electronic device of claim 6, wherein the one or more programs further include instructions for:

while depicting, in the user interface element, the destination location from the second perspective:

continuing to display the current view depicting the current location of the CSR setting from the first perspective.

11. The electronic device of claim 5, wherein the one or more programs further include instructions for:

while enlarging the display of the user interface element, panning the current view and a content of the user interface element based on a determined direction.

12. The electronic device of claim 5, wherein modifying the display of the current view to display the destination view comprises:

determining whether the received input represents movement of an object towards the electronic device; and in response to determining that the received input represents movement of the object towards the electronic device, proportionately enlarging the user interface element in accordance with a magnitude of the movement.

13. The electronic device of claim 12, wherein modifying the display of the current view to display the destination view comprises:

determining whether the movement of the object exceeds a threshold distance;

in response to determining that the movement of the object exceeds the threshold distance, replacing the display of the current view with a display of the destination view.

14. The electronic device of claim 13, wherein the one or more programs further include instructions for:

after replacing the display of the current view with the display of the destination view:

displaying a second user interface element, the second user interface element depicting the current location; and in response to receiving input representing selection of the second user interface element, modifying the display of the destination view to display a view of the current location.

15. The electronic device of claim 14, wherein modifying the display of the destination view to display the view of the current location comprises:

replacing the display of the destination view with a display of the view of the current location.

16. The electronic device of claim 5, wherein the electronic device is a head-mounted display having a head-facing sensor, and wherein the one or more programs further include instructions for:

obtaining gaze data representing eye gaze using the head-facing sensor; and determining the first determined direction using the obtained gaze data.

17. The electronic device of claim 5, wherein depicting the destination location comprises displaying, in the user interface element, movement of one or more virtual objects located at the destination location.

18. The electronic device of claim 5, wherein the user interface element is spherical.

19. The electronic device of claim 5, wherein the first determined direction is a direction corresponding to a first user, and wherein the destination view depicts the destination location from a fourth perspective corresponding to a determined direction corresponding to a second user different from the first user, the second user being located at the destination location.

20. A non-transitory computer-readable storage medium storing one or more programs configured to be executed by one or more processors of an electronic device, the one or more programs including instructions for:

displaying a current view of a CSR setting, the current view depicting a current location of the CSR setting from a first perspective corresponding to a first determined direction;

while displaying the current view of the CSR setting, displaying a user interface element, the user interface element depicting a destination location not visible from the current location; and in response to receiving input representing selection of the user interface element, modifying the display of the current view to display a destination view depicting the destination location, wherein modifying the display of the current view to display the destination view comprises enlarging the user interface element.

21. The non-transitory computer-readable storage medium of claim 20, wherein the one or more programs further include instructions for:
prior to receiving the input representing selection of the user interface element:
determining a second direction different from the first determined direction; and
modifying the display of the user interface element to depict the destination location from a second perspective determined using the second direction.

22. The non-transitory computer-readable storage medium of claim 21, wherein the one or more programs further include instructions for:
while modifying the display of the user interface element to depict the destination location from the second perspective:
modifying the current view to depict the current location of the CSR setting from a third perspective determined using the second direction.

23. The non-transitory computer-readable storage medium of claim 22, wherein displaying the user interface element comprises displaying the user interface element using a plurality of pixels of a display of the electronic device, and wherein the one or more programs further include instructions for:
while modifying the current view to depict the current location of the CSR setting from the third perspective:
continuing to display the user interface element using the plurality of pixels used to display the user interface element when the current view depicted the current location of the CSR setting from the first perspective.

24. The non-transitory computer-readable storage medium of claim 20, wherein modifying the display of the current view to display the destination view comprises:
determining whether the received input represents movement of an object towards the electronic device; and
in response to determining that the received input represents movement of the object towards the electronic device, proportionately enlarging the user interface element in accordance with a magnitude of the movement.

25. The non-transitory computer-readable storage medium of claim 24, wherein modifying the display of the current view to display the destination view comprises:
determining whether the movement of the object exceeds a threshold distance;
in response to determining that the movement of the object exceeds the threshold distance, replacing the display of the current view with a display of the destination view.

* * * * *